United States Patent
Lin et al.

(10) Patent No.: US 9,183,345 B2
(45) Date of Patent: Nov. 10, 2015

(54) APPARATUS AND METHOD FOR GENERATING A POWER DELIVERY NETWORK

(71) Applicant: INDUSTRIAL TECHNOLOGY RESEARCH INSTITUTE, Hsinchu (TW)

(72) Inventors: Chang-Tzu Lin, Taichung (TW); Ding-Ming Kwai, Hsinchu County (TW); Tsu-Wei Tseng, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/326,070

(22) Filed: Jul. 8, 2014

(65) Prior Publication Data
US 2015/0199467 A1    Jul. 16, 2015

(30) Foreign Application Priority Data
Jan. 14, 2014   (TW) .................. 103101319

(51) Int. Cl.
*G06F 17/50*   (2006.01)

(52) U.S. Cl.
CPC ........ *G06F 17/5081* (2013.01); *G06F 17/5077* (2013.01); *G06F 2217/08* (2013.01); *G06F 2217/78* (2013.01); *G06F 2217/82* (2013.01)

(58) Field of Classification Search
CPC ...................................................... G06F 17/50
USPC ........................................................ 716/127
See application file for complete search history.

(56) References Cited

U.S. PATENT DOCUMENTS

| | | | |
|---|---|---|---|
| 6,118,712 A | 9/2000 | Park et al. |
| 6,405,346 B1 | 6/2002 | Nawa |
| 7,079,998 B2 | 7/2006 | Tien et al. |
| 7,353,490 B2 | 4/2008 | Jiang et al. |
| 7,434,189 B2 | 10/2008 | Baumann et al. |
| 7,603,641 B2 | 10/2009 | Lin |
| 7,827,511 B2 | 11/2010 | Vaassen |
| 7,986,036 B2 | 7/2011 | Chen |
| 8,051,401 B2 | 11/2011 | Frederick |

(Continued)

FOREIGN PATENT DOCUMENTS

| | | | |
|---|---|---|---|
| CN | 1477697 A | 2/2004 |
| CN | 1917206 A | 2/2007 |

(Continued)

OTHER PUBLICATIONS

Hsien-Te Chen et al., "A New Architecture for Power Network in 3D IC" 2011 Design, Automation & Test in Europe Conference & Exhibition (Date), pp. 1-6, Mar. 2011.

(Continued)

*Primary Examiner* — Thuan Do
(74) *Attorney, Agent, or Firm* — Rabin & Berdo, P.C.

(57) ABSTRACT

An apparatus and method for generating a power delivery network (PDN) of a circuit system is provided. The apparatus performs a power diagnostics on the PDN of a circuit system. According to result of the power diagnostics, a number of areas are generated and divided into at least three subsets. At least one area is selected from each of the at least three subsets, and one node is selected from each of the selected areas, and the nodes are connected sequentially to form an interconnection with at least three nodes in the PDN.

22 Claims, 7 Drawing Sheets

(56) References Cited

U.S. PATENT DOCUMENTS

| | | | |
|---|---|---|---|
| 8,276,110 B2 | 9/2012 | Baviskar et al. | |
| 8,286,110 B1 | 10/2012 | Kukal et al. | |
| 8,327,306 B2 | 12/2012 | Oh et al. | |
| 2008/0244497 A1* | 10/2008 | Zhao et al. | 716/14 |
| 2012/0221312 A1 | 8/2012 | Dai et al. | |
| 2012/0242149 A1 | 9/2012 | Chuang et al. | |
| 2012/0250443 A1 | 10/2012 | Saraswat et al. | |
| 2012/0290996 A1 | 11/2012 | Law et al. | |

FOREIGN PATENT DOCUMENTS

| | | |
|---|---|---|
| CN | 101908080 A | 12/2010 |
| TW | 1266215 B | 11/2006 |

OTHER PUBLICATIONS

Nishit Kapadia et al., "A Power Delivery Network Aware Framework for Synthesis of 3D Networks-on-Chip with Multiple Voltage Islands" 2012 25th International Conference on VLSI Design (VLSID), pp. 262-267, Jan. 2012.

Kaijian Shi et al., "A Power Network Synthesis Method for Industrial Power Gating Designs" 8th International Symposium on Quality Electronic Design, 2007. ISQED '07, pp. 362-367, Mar. 2007.

Wan-Ping Lee et al., "An ILP Algorithm for Post-Floorplanning Voltage-Island Generation Considering Power-Network Planning" ICCAD '07, Proceedings of the 2007 IEEE/ACM International Conference on Computer-aided design, pp. 650-655, Nov. 2007.

Qiang Zhou et al., "Floorplanning Considering IR Drop in Multiple Supply Voltages Island Designs" IEEE Transactions on Very Large Scale Integration (VLSI) Systems, vol. 19, No. 4, Apr. 2011.

Chieh-Jui Lee et al., "Hierarchical Power Network Synthesis for Multiple Power Domain Designs" 2012 13th International Symposium on Quality Electronic Design (ISQED), pp. 477-482, Mar. 2012.

Jaewon Oh et al., "Multi-pad Power/Ground Network Design for Uniform Distribution of Ground Bounce" Proceedings Design Automation Conference, 1998, pp. 287-290, Jun. 1998.

Wan-Ping Lee et al., "Post-Floorplanning Power/Ground Ring Synthesis for Multiple-Supply-Voltage Designs" ISPD '09, Proceedings of the 2009 International Symposium on Physical Design, pp. 5-12, Mar. 2009.

Paul Falkenstern et al., "Three-Dimensional Integrated Circuits (3D IC) Floorplan and Power/Ground Network Co-synthesis" 2010 15th Asia and South Pacific Design Automation Conference (ASP-DAC), pp. 169-174, Jan. 2010.

\* cited by examiner

APPARATUS AND METHOD FOR GENERATING A POWER DELIVERY NETWORK

This application claims the benefit of Taiwan application Serial No. 103101319, filed Jan. 14, 2014, the disclosure of which is incorporated by reference herein in its entirety.

TECHNICAL FIELD

The disclosure relates in general to apparatus and method for generating a power delivery network.

BACKGROUND

There are many researches related to the design of power delivery network (Power Delivery Network, or Power Distribution Network, or Power Network, hereinafter all referred to as "PDN"). Generally speaking, there are many nodes in the PDN. The quality of PDN are mainly influenced by the resistance of the transmission line, i.e. when current flowing through a section of the transmission line, because of the presence the resistance, the voltage drop would be generated. The voltage drop is also known as IR drop ("I" represents current and "R" represents resistance). The voltage drop would lower the stability of the circuit system, and even cause the error of the circuit. For example, in an integrated circuit (IC), large voltage drop happened in the PDN would cause malfunction of the IC. And, the quality of the PDN would influence the power integrity (PI) of the IC.

Normally, the design of the PDN would be in uniform type. For example, horizontal/vertical power stripes of the PDN have the same spacing and width. Owing to the large voltage drop, the power supply may be not enough since different areas have different power supply requirements. Or, the power supply would be overdesigned which wasting signal winding resources. To avoid the above issues are engaged by industry.

FIG. 1 illustrates a flow diagram of a current integrated circuit design (hereinafter referred to as "IC design"). The current IC design includes circuit design step 102, floorplan and PDN design step 104, circuit unit placement and clock tree generation step 106, routing step 108, and power analysis step 110. After power analysis step 110, if it is necessary to provide power distribution network adjustment, the designer should go back to the floorplan and PDN design step 104 from power analysis step 110 to redesign the PDN, for instance, to increase the dense of the PDN or to widen the line width of the PDN or to increase the numbers of the power sources. When redesigning, step 104 to step 110 should be repeated with lengthy turn-around time. The total IC design time will be lengthened. If the designer repeats redesigning for several times, it may cause a significant delay in the IC design process.

SUMMARY

According to one embodiment, an apparatus for generating a PDN of a circuit system is provided. The apparatus may comprise a power analyzer configured to perform a first power diagnostics on the PDN of the circuit system and generate a number of areas according to the result of the first power diagnostics. The areas may be divided into at least three subsets. At least one area may be selected from each of the at least three subsets, one node may be selected form each of the selected areas. The nodes are connected orderly (sequentially) to form an interconnection with at least three nodes in the PDN.

According to an alternative embodiment, a method for generating a PDN of a circuit system is provided. The method may perform a first power diagnostics on the PDN of the circuit system and generate a number of areas according to the result of the first power diagnostics. The areas may be divided into at least three subsets. At least one area may be selected from each of the at least three subsets. One node may be selected form each of the selected areas. The nodes may be connected orderly (sequentially) to form an interconnection with at least three nodes in the PDN.

Figure 1:
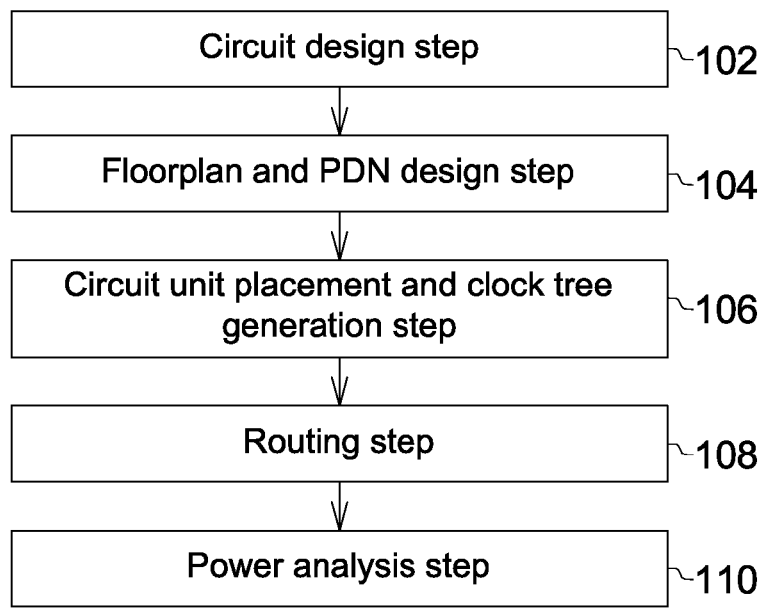
FIG. 1 illustrates a flow diagram of a current integrated circuit design.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the disclosure set forth herein. Descriptions of well-known parts are omitted for clarity, and like reference numerals refer to like elements throughout.

Figure 2:
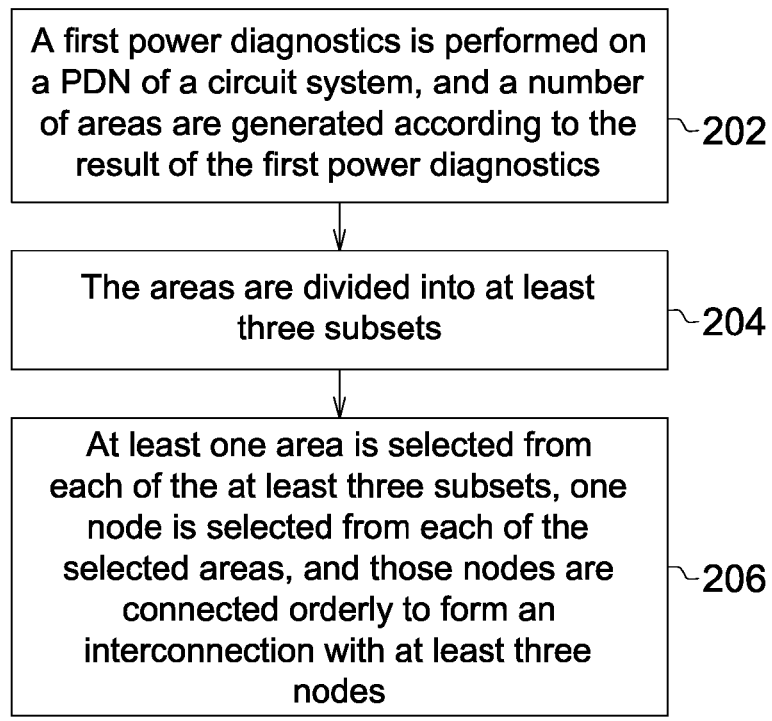
FIG. 2 illustrates an exemplary flow diagram of a method for generating a PDN according to an embodiment of the disclosure.

FIG. 2 illustrates an exemplary flow diagram of a method for generating a PDN according to an embodiment of the disclosure. First, in step 202, a first power diagnostics is performed on a PDN of a circuit system. A number of areas are generated according to the result of the first power diagnostics. There is at least one node in each area. After that, the areas are divided into at least three subsets in step 204. Then, in step 206, at least one area is selected from each of the at least three subsets, and one node is selected from each of the selected areas. Those nodes are connected orderly (sequentially) to form an interconnection with at least three nodes in the PDN.

Figure 3:
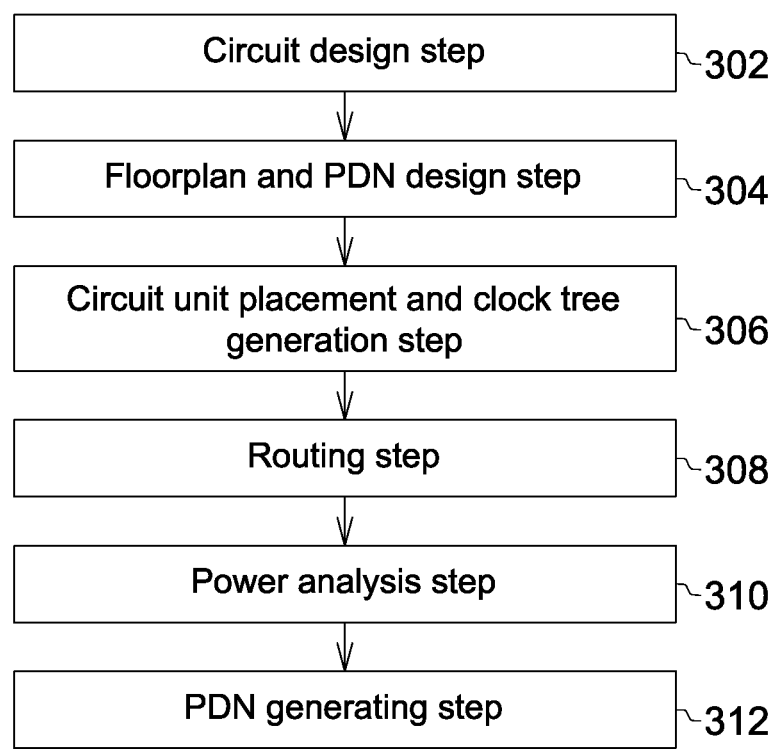
FIG. 3 shows a flow diagram of circuit system design with applying the method for generating the PDN in FIG. 2.

FIG. 3 shows a flow diagram of circuit system design with applying the embodiment of the method for generating the PDN in FIG. 2. The circuit system design in FIG. 3 could be an IC design or any other circuit system design with PDN. The steps for the circuit system design in FIG. 3 includes circuit design step 302, floorplan and PDN design step 304, circuit unit placement and clock tree generation step 306, routing step 308, power analysis step 310, and PDN generating step 312. Performing a first power diagnostics on the PDN in the step 202 is accomplished in step 310. The PDN generating step 312 includes step 204, step 206, and the other part of step 202. According to the flow of circuit system design of FIG. 3, step 308 is before step 312. Therefore, when generating the PDN, it is not necessary to go back to floorplan and PDN design step 304 to redesign the PDN and perform steps 306 and 308, which is time-consuming. The flow of the circuit system design with applying the method for generating the PDN of this embodiment could build a PDN of a circuit system by repeating step 310 and step 312. The design time of the circuit system could be saved greatly. The product of the circuit system could go into the market quickly.

Figure 4:
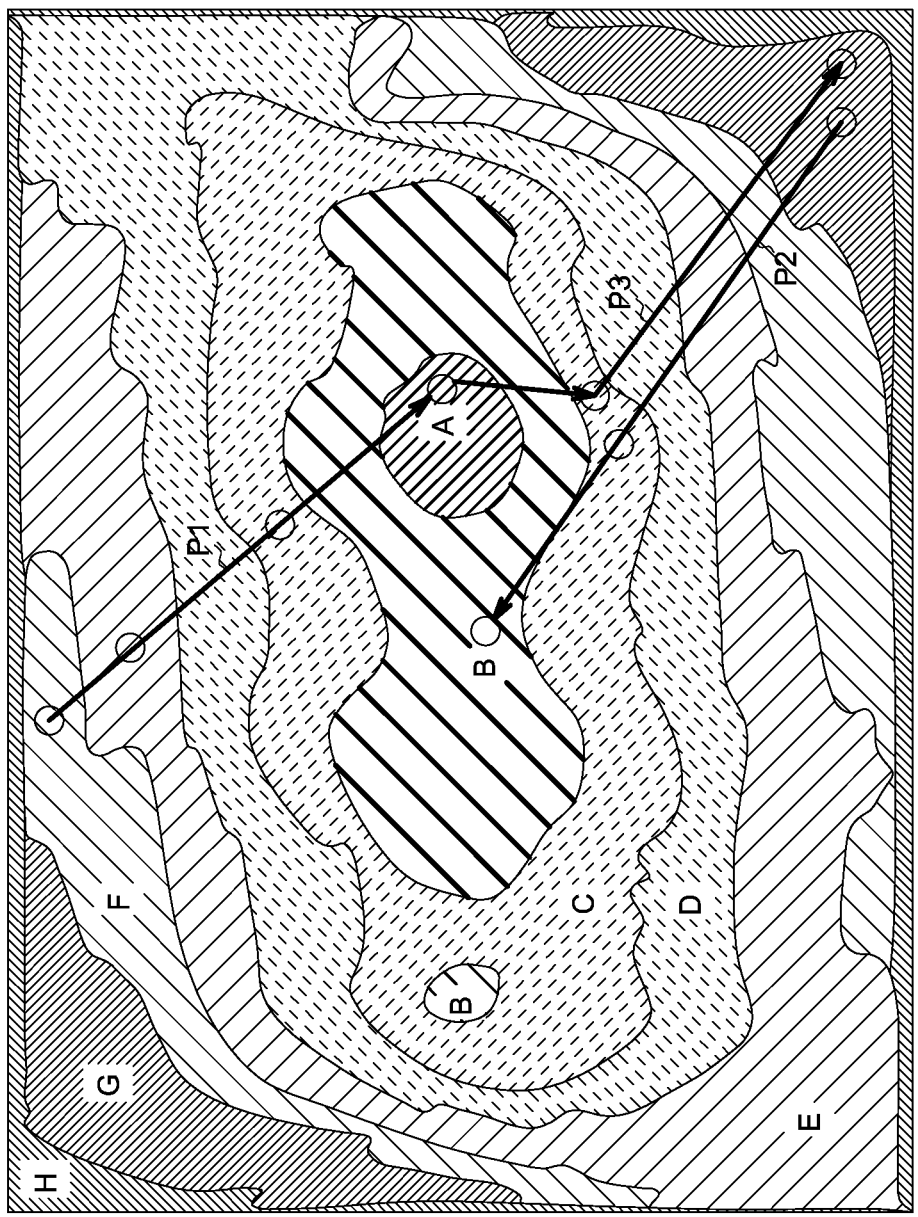
FIG. 4 illustrates one example, in which a number of exemplary interconnections or paths are shown according to an exemplary embodiment.

To be more detailed, in the step 202 of FIG. 2, a number of areas are generated according to the result of the first power diagnostics, and the locations of the areas and the level of voltage drop would be further analyzed. In step 204, part or all areas are selected to be target areas. These target areas are divided into at least three subsets. Each of the subsets would contain at least one target area. At least one target area is selected from each of the at least three subsets in step 206, and one node is selected from each of the selected target areas and the nodes are connected orderly (sequentially) to form an interconnection, i.e. PDN path, with at least three nodes in the PDF. A number of interconnections or PDN paths can be formed in several target areas. FIG. 4 shows one example, in which exemplary interconnections or PDN paths include interconnections P1, P2 and P3, for example. When forming the interconnections or PDN paths, the target areas to be connected and the order of connections are taken into consideration.

Figure 5:
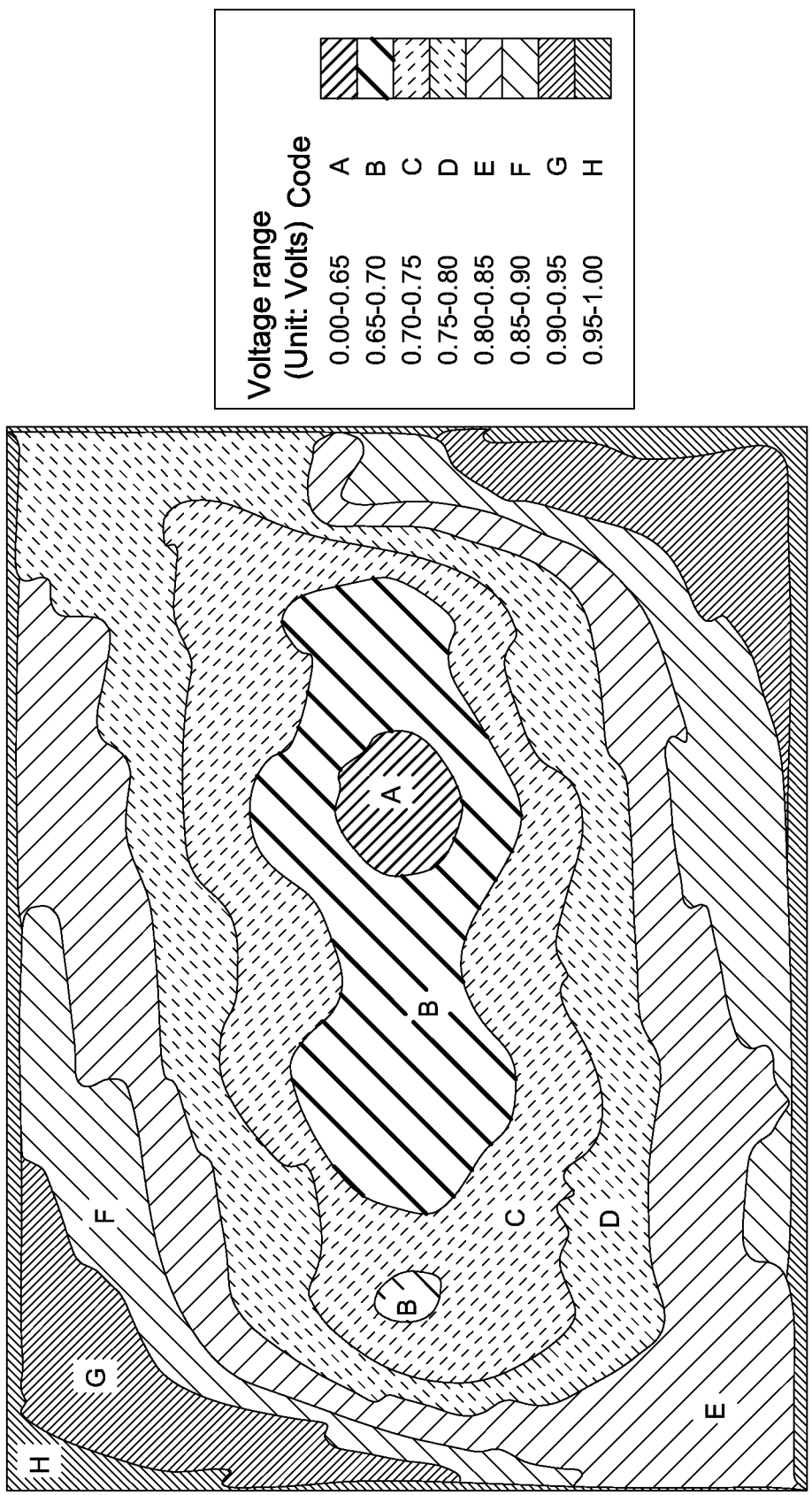
FIG. 5 illustrates exemplary target areas for generating a PDN according to an exemplary embodiment.

Base on the above descriptions, the following provides more detailed descriptions for each step. Assume the range from 0.65 V to 1.0 V is divided to obtain 7 voltage ranges, as shown in FIG. 5. 0 V to 0.65 V is an independent voltage range. Therefore, 8 voltage ranges are obtained. The 8 voltage ranges are referred as 8 voltage drop ranges. (For another exemplary embodiment, the number of the voltage ranges can be modified. For example, 10 voltage ranges could be used.) After performing the first power diagnostics, 8 areas are produced based on the 8 voltage ranges. Referring to FIG. 5, there are 8 areas represented by A, B, C . . . , and H in the circuit system. At least 3 target areas could be selected from the areas for PDN generating.

After that, the selected target areas can be divided to at least 3 subsets. The following would be an example with 3 subsets. Assume the 8 areas are all selected as 8 target areas in FIG. 5. According to the level of voltage drop shown in FIG. 6, the 8 target areas are arranged orderly (sequentially) as target areas A, B . . . H from the most serious level to the least serious level of voltage drop. A and B target areas belong to the first subset. C, D and E target areas belong to the second subset. F, G and H target areas belong to the third subset. The PDN of the circuit system could be divided to 3 subsets orderly (sequentially) according to the level of voltage drop. The first subset includes A and B target areas whose voltage drop levels are most serious. The second subset includes C, D and E target areas whose voltage drop levels are less serious than the first subset. The third subset includes F, G and H target areas whose voltage drop levels are least serious in this example.

Figures 6, 7A, 7B, 7C:
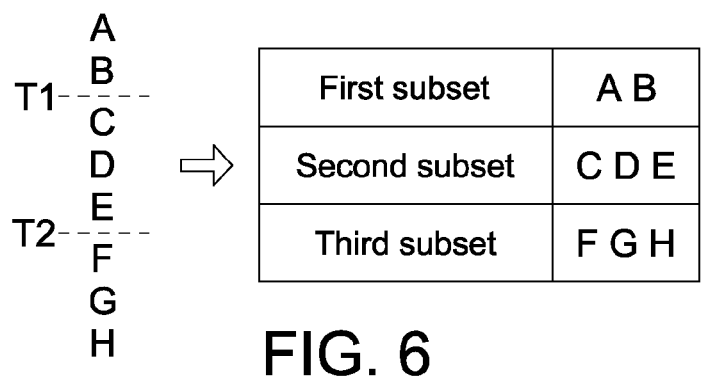
FIG. 6 illustrates an exemplary method of producing subsets according to an exemplary embodiment.
FIGS. 7A~7C illustrate an example of producing a number of interconnections according to an exemplary embodiment.
Figure 8:
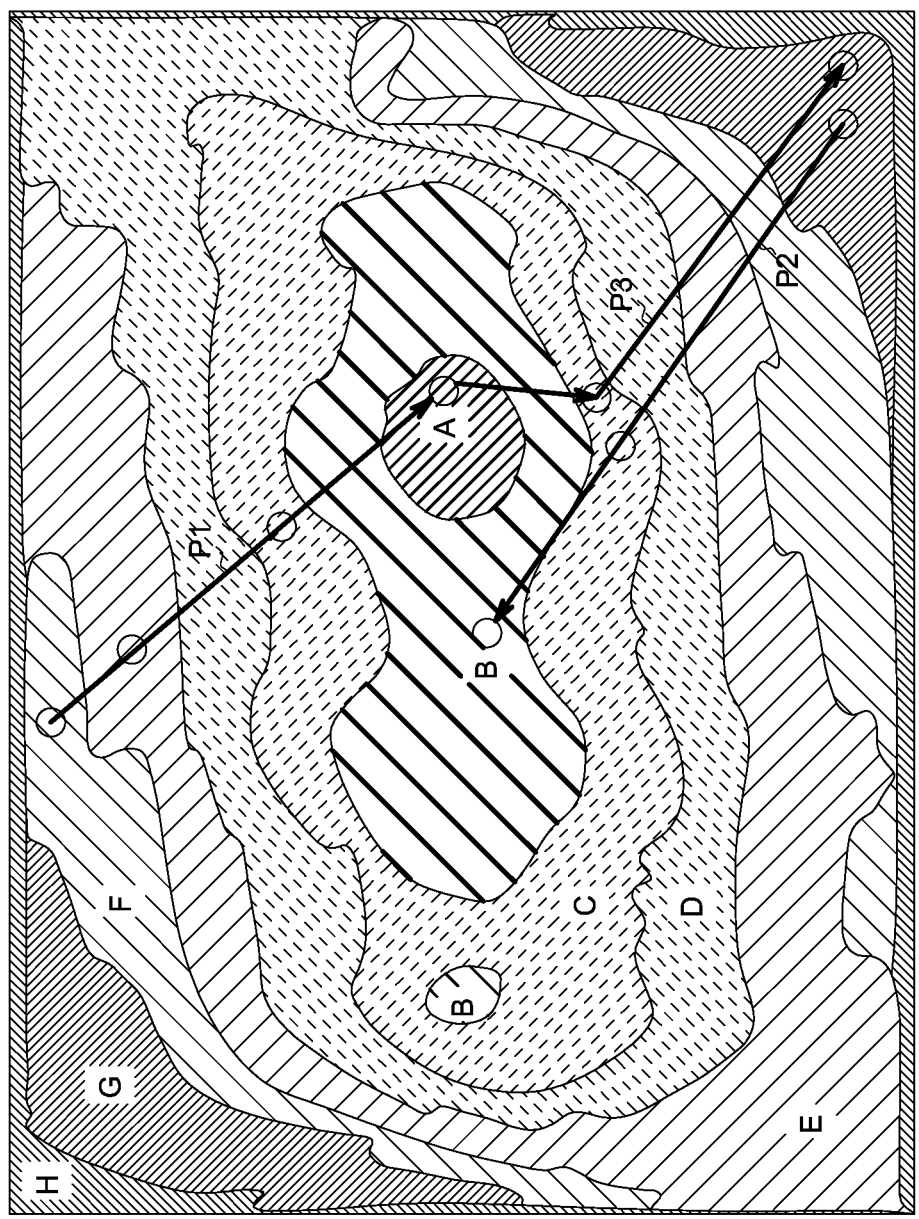
FIG. 8 illustrates an example of interconnections in the PDN according to an exemplary embodiment.

According to the method for generating the PDN in this embodiment of the disclosure, a PDN interconnection could be formed by selecting at least one target area from each subset. Referring to FIG. 7A, the selected target areas could be A target area from the first subset, C and E target areas from the second subset, and F target area from the third subset. One node could be selected from each of the selected target areas. Interconnection P1 could be formed by connecting those nodes selected from the selected target areas A, C, E, and F. The interconnection P1 passes through the selected target areas F, E, C and A orderly (sequentially). As showed by FIG. 8, interconnection P1 starts from the third subset, whose voltage drop level is least serious, passes through the second subset, whose voltage drop level is less serious, and ends in the first subset, whose voltage drop level is most serious.

After that, referring to FIG. 7B, the selected target areas could be B target area from the first subset, C target area from the second subset, and G target area from the third subset. One node could be selected from each of the selected target areas. Interconnection P2 could be formed by connecting those nodes selected from the selected target areas B, C, and G. The interconnection P2 passes through the selected target areas G, C and B orderly (sequentially) As showed by FIG. 8, interconnection P2 starts from the third subset, whose voltage drop level is least serious, passes through the second subset, whose voltage drop level is less serious, and ends in the first subset, whose voltage drop level is most serious.

Referring to FIG. 7C, the selected target areas could be A target area from the first subset, C target area from the second subset, and G target area from the third subset. One node could be selected from each of the selected target areas. Interconnection P3 could be formed by connecting those nodes selected from the selected target areas A, C and G. The interconnection P3 passes through the selected target areas A, C and G orderly (sequentially) As showed by FIG. 8, interconnection P3 starts from the first subset, whose voltage drop level is most serious, passes through the second subset, whose voltage drop level is less serious, and ends in the third subset, whose voltage drop level is least serious.

Thus, the designer could generate lots of PDN paths with characteristic of order and characteristic of direction according to the level of voltage drop and position of the areas to form the PDN. The number of the target areas and interconnections could be decided by the designer in this embodiment of the disclosure. The target area is a 2 dimensional block, therefore the problem of voltage drop could be handled with the aspect of "surface". Further, the total circuit units would be the same because the existing design of PDN is used in the circuit system for this disclosure.

Figure 9:
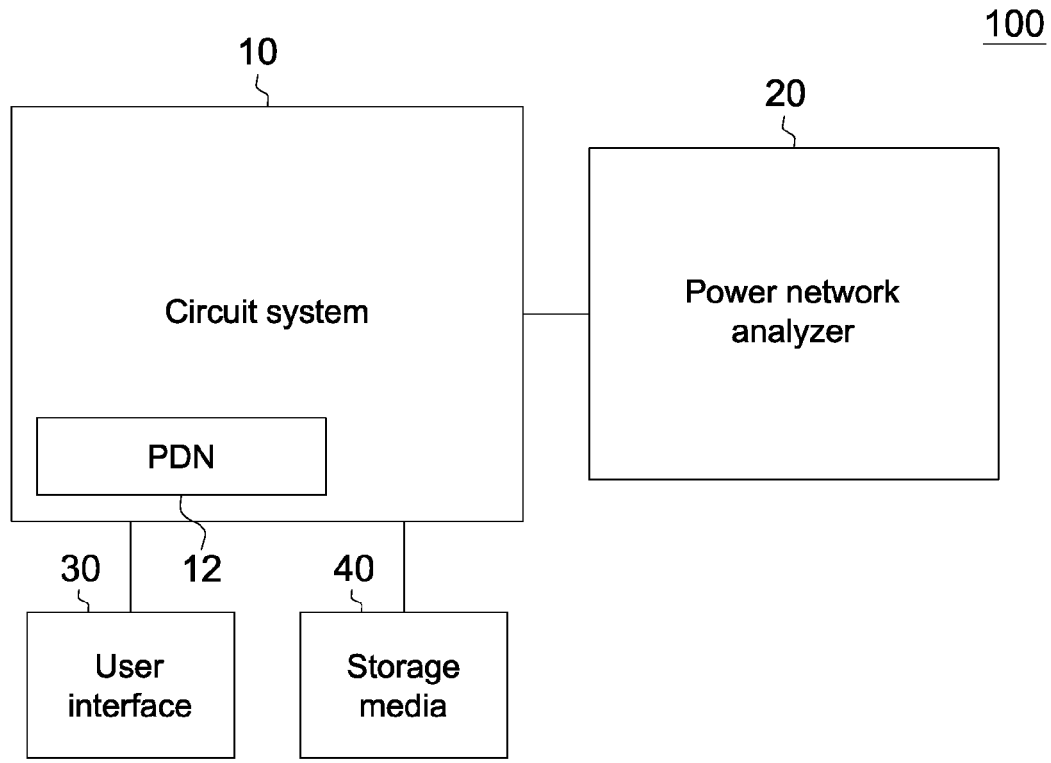
FIG. 9 illustrates an exemplary block diagram of an apparatus for generating a PDN according to an exemplary embodiment

FIG. 9 illustrates an exemplary block diagram of an apparatus for generating a PDN according to an embodiment. Applying power network analyzer 20, PDN device 100 performs a first power diagnostics on a PDN 12 of a circuit system 10. A number of areas are generated according to the result of the first power diagnostics. The areas are divided into at least three subsets. At least one area is selected from each of the at least three subsets, one node is selected from each of the selected areas, and the nodes are connected orderly (sequentially) to form an interconnection with at least three nodes in the PDN 12.

According to an exemplary embodiment, the interconnection would have a segment between each two adjacent nodes. The segments could have the same or different metal width.

The interconnection could be formed via I/O pads, rings, strips, bumps, rails, and through silicon vias (TSV), or a combination thereof. According to another exemplary embodiment, the interconnection could be vertical metal segment, horizontal metal segment, and diagonal metal segment, or a combination thereof. According to another exemplary embodiment, the nodes of the interconnection could be located in different metal layers as well as the segments. The same interconnection could pass through different metal layers. The metal layers are the routing metal layers of the circuit system. According to another exemplary embodiment, the interconnection could be formed according to a circuit design rule or a design rule checking, or further according a design rule of nodes connection among different metal. Power diagnostics includes voltage drop analysis.

Figure 10A:
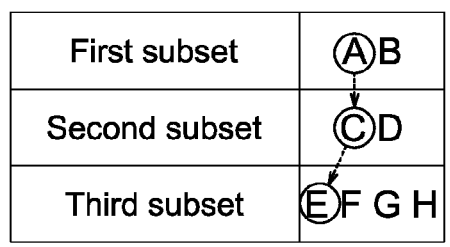
FIG. 10A~10B illustrate another example of producing interconnections according to an exemplary embodiment.
Figure 10B:
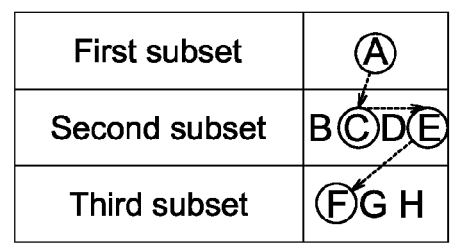

According to an exemplary embodiment, power network analyzer 20 could perform power diagnostics again while a number of interconnections have been formed in the target areas. The above steps of forming an interconnection could be repeated to form another interconnection in the target areas. For example, after PDN generating step 312, the designer could go back to power analysis step 310 and perform power diagnostics again for the IC having a number of PDN paths. And then, the designer could perform PDN generating step 312 and generate another interconnection. The PDN of the circuit system could be further constructed or compensated by the another interconnection. FIG. 10A and FIG. 10B shows another examples of producing interconnection. Referring to FIG. 10A, the another interconnection could be formed through the nodes of target areas A, C and E. Or, referring to FIG. 10B, the interconnection could be formed through the nodes of target areas A, C, E and F. After performing the power diagnostics again and generating the areas, the number of areas should be not limited to 8 as shown in FIG. 10A and FIG. 10B. The number of areas could be 10, 16, and so on. Performing the power diagnostics and forming the interconnections could be executed for many times until the PDN of the circuit system is with sufficient integrity or stability, or until the winding space used up.

Referring to FIG. 9, according to an exemplary embodiment, the areas could be divided into at least 3 subsets based on at least 2 target values. The at least 2 target values could be defined by the user interface 30, or defined by reading from the storage media 40. The at least 2 target values are less than the operation voltage. The operation voltage is between the power source voltage and the ground voltage, or is equal to the power source voltage. In other embodiment, the operation voltage can be equal to the ground voltage, and the at least 2 target values are larger than the operation voltage (i.e. the ground voltage). In this embodiment, the ground bounce can be efficiently reduced. The power network analyzer 20 is used to perform power diagnostics by analyzing the voltage drop of each node in the PDN of the circuit system or ground bounce noise or the combination thereof. According to an exemplary embodiment, each of the at least 3 subsets could be further subdivided into at least 3 subsets, and the method for generating the PDN paths or interconnections disclosed above can be repeated. That is, the designer could perform power diagnostics again, and select sub-nodes from each subset of the subsets to form the interconnections. There is no limitation for the number of times for above steps.

Using integrated circuit as a test carrier to perform an experiment, the method for generating the PDN of this disclosure is used in this experiment. In this experiment, the density of the PDN paths increases 16.67% and 32.47%, respectively, for example. However, the present disclosure is not limited thereto. The density of the PDN paths interconnections could be designed according to the result of the power diagnostics. For example, when the density of the PDN paths increases 16.67%, the improvement of voltage drop could be 33.08%. When the density of the PDN paths increases 32.47%, the improvement of voltage drop could be up to 36.72%. Thus, the proposed method and apparatus of this disclosure could avoid the time-consuming redesign of PDN, reduce the design time of IC design and make the product of IC go to the market earlier, reduce the voltage drop of the PDN effectively, and enhance the overall stability and quality of PDN.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An apparatus for generating a PDN (power delivery network) of a circuit system, the apparatus comprising:
a power analyzer, configured to perform a first power diagnostics on the PDN of the circuit system and generate a plurality of areas corresponding to different voltage ranges according to the result of the first power diagnostics;
wherein the areas are divided into at least three subsets according to different levels of voltage drop, and
wherein at least one area is selected from each of the at least three subsets, one node is selected from each of the selected areas, and the nodes are connected sequentially to form an interconnection with at least three nodes in the PDN.

2. The apparatus according to claim 1, wherein the apparatus further comprising a user interface or a storage media, and the areas are divided into the at least three subsets according to at least two target voltage values corresponding to voltage boundaries of the at least three subsets, the at least two target voltage values being obtained from the user interface or read from the storage media.

3. The apparatus according to claim 2, wherein either:
the at least two target voltage values are less than an operation voltage of the PDN and the operation voltage is between a power source voltage and a ground voltage, or is substantially equal to the power source voltage, or
the operation voltage of the PDN is substantially equal to the ground voltage, and the at least two target voltage values are each larger than the operation voltage.

4. The apparatus according to claim 1, wherein the power analyzer is used to perform the first power diagnostics by analyzing at least one of voltage drops of the PDN and a ground bounce noise.

5. The apparatus according to claim 1, wherein the interconnection has a segment between each two adjacent nodes, and the segments have the same or different metal width, and the interconnection comprises a horizontal metal segment, a vertical metal segment, a diagonal metal segment, or a combination thereof.

6. The apparatus according to claim 1, wherein the nodes of the interconnection are located in different metal layers.

7. The apparatus according to claim 1, wherein each of the at least three subsets are further divided into at least three subsets.

8. The apparatus according to claim 1, wherein the nodes of the interconnection are selected from the group consisting of I/O pads, rings, strips, bumps, rails, through silicon vias, and a combination thereof.

9. The apparatus according to claim 1, wherein the interconnection is formed according to a circuit design rule or a design rule checking, or further according to a design rule of nodes connection among different metals.

10. The apparatus according to claim 1, wherein the power analyzer performs a second power diagnostics after the interconnection is formed, and another interconnection is generated with at least three nodes connected sequentially in the PDN accordingly.

11. The apparatus according to claim 1, wherein the nodes of the interconnection are connected according to the order of the areas, and the interconnection has the characteristics of a surface.

12. A method for generating a PDN of a circuit system, the method comprising:
   performing a first power diagnostics on the PDN of the circuit system by a PDN device;
   generating a plurality of areas corresponding to different voltage ranges according to the result of the first power diagnostics;
   dividing the areas into at least three subsets according to different levels of voltage drop; and
   selecting at least one area from each of the at least three subsets, selecting one node from each of the selected areas, and connecting the nodes sequentially to form an interconnection with at least three nodes in the PDN.

13. The method according to claim 12, wherein the method further comprises defining at least two target voltage values and dividing the areas into the at least three subsets according to the at least two target voltage values corresponding to voltage boundaries of the at least three subsets, the at least two target voltage values being obtained from a user interface or read from a storage media.

14. The method according to claim 13, wherein either:
   the at least two target voltage values are less than an operation voltage of the PDN and the operation voltage is between a power source voltage and a ground voltage, or is substantially equal to the power source voltage, or the operation voltage of the PDN is substantially equal to the ground voltage, and the at least two target voltage values are larger than the operation voltage.

15. The method according to claim 12, wherein a power analyzer is used to perform the first power diagnostics by analyzing at least one of voltage drops of the PDN and a ground bounce noise.

16. The method according to claim 12, wherein the interconnection has a segment between each two adjacent nodes, and the segments have the same or different metal width, and the interconnection comprises a horizontal metal segment, a vertical metal segment, a diagonal metal segment, or a combination thereof.

17. The method according to claim 12, wherein the nodes of the interconnection are located in different metal layers.

18. The method according to claim 12, wherein each of the at least three subsets are further divided into at least three subsets.

19. The method according to claim 12, wherein the nodes of the interconnection are selected from the group consisting of I/O pads, rings, strips, bumps, rails, through silicon vias, and a combination thereof.

20. The method according to claim 12, wherein the interconnection is formed according to a circuit design rule or a design rule checking, or further according to a design rule of nodes connection among different metals.

21. The method according to claim 12, further comprising:
   performing a second power diagnostics after the interconnection is formed, and repeating above steps to generate another interconnection with at least three nodes connected sequentially in the PDN accordingly.

22. The method according to claim 12, wherein the nodes of the interconnection are connected according to the order of the areas, and the interconnection has the characteristics of a surface.

* * * * *